United States Patent
Vogt et al.

(10) Patent No.: US 8,698,801 B2
(45) Date of Patent: Apr. 15, 2014

(54) METHOD OF VISUALIZING GEOMETRIC UNCERTAINTIES

(75) Inventors: Dietmar Vogt, Neu Wulmstorf (DE); Michael Olbert, Jork (DE); Josef Schlattmann, Rheine (DE)

(73) Assignee: EADS Deutschland GmbH (DE)

( * ) Notice: Subject to any disclaimer, the term of this patent is extended or adjusted under 35 U.S.C. 154(b) by 1010 days.

(21) Appl. No.: 12/701,945

(22) Filed: Feb. 8, 2010

(65) Prior Publication Data

US 2010/0268515 A1   Oct. 21, 2010

(30) Foreign Application Priority Data

Feb. 9, 2009  (EP) .................................... 09001763

(51) Int. Cl.
*G06T 15/30* (2011.01)
(52) U.S. Cl.
USPC ............. 345/423; 345/581; 703/2; 703/6; 382/128
(58) Field of Classification Search
USPC ................. 345/423, 581; 703/2, 6; 382/128
See application file for complete search history.

(56) References Cited

U.S. PATENT DOCUMENTS

| | | | |
|---|---|---|---|
| 2005/0185829 A1 | 8/2005 | Heismann | |
| 2007/0030266 A1* | 2/2007 | Styles | 345/420 |
| 2007/0282579 A1 | 12/2007 | Dempster | |
| 2008/0126024 A1 | 5/2008 | Gottsman | |
| 2009/0010506 A1 | 1/2009 | Schilling | |
| 2009/0174720 A1 | 7/2009 | Brown | |

FOREIGN PATENT DOCUMENTS

| | | |
|---|---|---|
| DE | 19818582 A1 | 10/1999 |
| DE | 10207503 B3 | 3/2004 |
| DE | 102004008519 A1 | 9/2005 |
| DE | 102005016955 A1 | 10/2006 |

OTHER PUBLICATIONS

P.M. Thompson, C. Schwartz, A.W. Toga: "High-Resolution Random Mesh Algorithms for Creating a Probabilistic 3D Surface Atlas of the Human Brain" Neuroimage, vol. 3, 1996, XP002542139, Los Angeles, the section "Probability Mapping Theory".

* cited by examiner

*Primary Examiner* — Said Broome
*Assistant Examiner* — Peter Hoang
(74) *Attorney, Agent, or Firm* — Lerner, David, Littenberg, Krumholz & Mentlik, LLP

(57) ABSTRACT

A method of constructing an enveloping mesh geometry (EMG) for a plurality of sample mesh geometries (MG). The enveloping mesh geometry is a geometric representation of the mean of the probability distribution underlying the sample space from which the enveloping mesh geometry (MG) have been drawn. The method is based on estimating probability densities $f_j$ using the kernel density method. The method further comprises constructing, based on the enveloping mesh geometry (EMG) so constructed, further enveloping mesh geometries (EMG-$\alpha$) related to the $\alpha$-Quantiles of the probability distribution. The enveloping mesh geometries (EMG, MG-$\alpha$) are suitable for development and test procedures in aircraft and automotive manufacturing processes.

8 Claims, 4 Drawing Sheets

METHOD OF VISUALIZING GEOMETRIC UNCERTAINTIES

FIELD OF THE INVENTION

The invention relates to data processing. More particularly, the invention relates to a method and a system for constructing an enveloping mesh geometry for a plurality of sample mesh geometries usable in manufacturing and testing processes.

BACKGROUND OF THE INVENTION

Aircraft and automakers are concerned with manufacturing highly complex systems. Aircrafts and cars have to be manufactured to a multitude of strict security and safety regulations.

Components of aircraft are complex and expensive systems in their own rights. Therefore, in order for industry to operate at acceptable margins, manufacturing processes for those components need to be highly efficient to ensure high output that nevertheless complies with those standards.

Development and testing are crucial stages in the manufacturing pipeline binding considerable resources. In many cases, the data on which testing and development of the components is based is available as a large number of samples of high-dimensional, computerized mesh geometries representing shape and forms or other qualities or parameters of the components to be manufactured or tested.

The mesh geometries comprise a large number of data points in spatial or higher dimensional coordinates. The mesh geometries are obtained for example from real-life crash-tests or from tests implemented as computer simulations. The mesh geometries so obtained are subject to statistical variations.

There is an issue in prior art development and testing systems in that those statistical variations are represented and acquired only in a point-wise manner across the totality of data points in the mesh geometries. Prior art systems allow for example the representation of the variation as a single value or as a pair of maximum and minimum value in relation to only one data point at a time across the plurality of mesh geometries. The statistical variations across all the mesh geometries each taken as a whole hitherto defies acquisition and representation by current systems.

There is therefore a need in the art to address the issues identified above.

BRIEF SUMMARY OF THE INVENTION

The invention addresses the issues identified above by providing a method of constructing an enveloping mesh geometry for a plurality of sample mesh geometries. The method comprises the following steps. Data points in one of the plurality of sample mesh geometries are selected. For each selected data point, corresponding data points in ones of the other sample mesh geometries are established to obtain different sets of corresponding data points. Each selected data point is contained in exactly one of the sets. A probability density for each one of the sets of corresponding data points is then estimated. Based on the estimated probability densities, mean data points are obtained. The enveloping mesh geometry is then constructible by using the obtained mean data points.

According to one aspect of the present invention, the enveloping mesh geometries are constructed by replacing each of the selected data points or each of the corresponding data points in any one of the sample mesh geometries with an associated one of the mean data points. The associated mean data point is an argument of the maximum value of the respective one of the estimated probability densities or is related to such a maximizing argument. The association can be established by way of the respective set of corresponding points used to estimate the respective estimated probability density.

The mean data points or the constructed enveloping mesh geometry allow consolidating the statistical variations in each of the possibly numerous sample mesh geometries into a single, integrated data structure. The enveloping mesh geometry is a geometric representation of the expected value or mean of the probability distribution of the sample space from which the statistical ensemble of the sample mesh geometries is thought to have been drawn.

The selection of the data points and/or the number of the sample mesh geometries covered for the purposes of establishing the corresponding data points may or may not be exhaustive, depending on user requirements such as CPU time available for constructing the enveloping mesh geometry or the desired statistical accuracy of the enveloping mesh geometry. For example, in some use case scenarios it may be desirable to select all the data points in one the sample mesh geometry and to establish the corresponding data points across all the sample mesh geometries.

However in other scenarios, the user may prefer to have the construction of the enveloping mesh geometries restricted to certain regions of interest within the sample mesh geometries or simply to fewer data points to speed up the construction process. The selection of the data points may then reflect the region of interest and/or the CPU requirements. Alternatively or additionally, the user may wish to speed up the construction even further by selecting not all but a fewer number of the sample mesh geometries for establishing the corresponding points therein.

The method according to the invention further allows based on the constructed enveloping mesh geometries to construct further enveloping mesh geometries called alpha-level enveloping mesh geometries.

The alpha-level enveloping mesh geometries are suitable to statistically envelop the sample mesh geometries at an enveloping degree corresponding to a predetermined alpha-level. In other words, the alpha-level enveloping mesh geometries envelop on average alpha-percent of the sample mesh geometries or further sample geometries sampled form the probability distribution mentioned earlier. The method according to the invention therefore allows constructing the alpha-level enveloping mesh geometries to envelop sample mesh geometries and further samples of mesh geometries in a statistically correct manner.

The alpha-level enveloping mesh geometries are constructible by averaging normals of elements of the enveloping mesh geometry or of elements of a convex hull of the enveloping mesh geometry to obtain averaged normals associated with the mean data points. The estimated probability densities are then solved along the associated averaged normals for a predetermined value related to the alpha-level to obtain alpha-enveloping data points of the alpha-enveloping mesh geometry. The alpha-enveloping mesh geometry is obtained by joining the alpha-enveloping data points whilst retaining a mesh structure of the underlying enveloping mesh geometry.

According to a further aspect of the invention, if a mean data point is a singular point of the enveloping mesh geometry, the estimated probability densities are solved for the predetermined value of the alpha-level along a bundle of lines emanating from the singular mean data point to obtain a corresponding bundle of alpha-enveloping data points associated with the singular point. A singular point is for example a point on the boundary of the mesh geometry. A singular point has fewer neighboring mesh elements than non-singular points. There is therefore less local geometric information around singular points. The bundle of lines "spreads" additional geometric information around the singular point to effect discretization of the space around that point. The added discretization allows acquiring reliable estimates for statistical variations even around those points. The method according to the invention is also applicable to mesh geometries representing bucklings and dents.

According to one aspect of the present invention, the probability density is estimated using the kernel density estimation method or other non-parametric estimation methods.

The method is also applicable to statistical collision detection. For example, statistical collisions can be detected by applying Boolean logic operations to alpha-enveloping mesh geometries constructed for different mesh geometries representing colliding entities or self intersections.

According to a further aspect, the invention also provides a development and hardware tool to implement the method in manufacturing environment.

In this or similar environments, the method further comprises displaying the sample mesh geometry of the developed or manufactured parts inside the enveloping mesh geometry or the alpha-enveloping mesh geometry to allow visually or automatically test compliance with manufacturing tolerances, the tolerances being related to the specified alpha level. Basing the graphical representation on the (alpha-) enveloping mesh geometries allows an integrated and complete view on the statistical variations across the plurality of the sample mesh geometries. Compliance with quality standards or test results can be assessed—visually/manually or automatically—more quickly.

This allows for more efficient execution of work in the development and testing stages of manufacturing pipelines. The method is also applicable to statistical analysis of computer simulations.

BRIEF DESCRIPTION OF THE DRAWINGS

A more complete appreciation of the invention and the attendant advantages thereof will be more clearly understood by reference to the following schematic drawings, which are not to scale, wherein.

DETAILED DESCRIPTION

Figure 1:
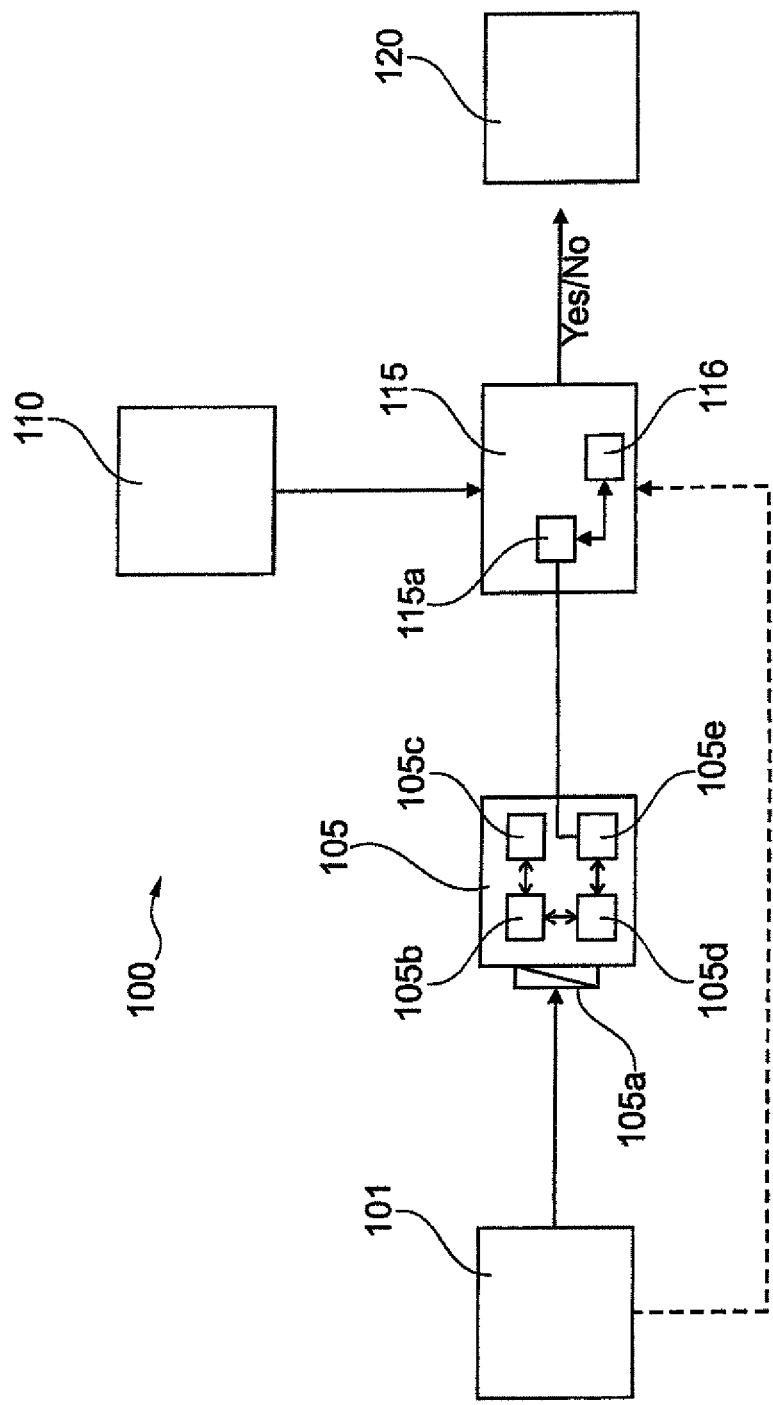
FIG. 1 is a block diagram depicting the computer-aided development or testing tool according to the invention in a manufacturing pipeline.

Referring now to the drawings wherein like reference characters designate like parts and steps throughout the several views, FIG. 1 outlines basic components of a manufacturing pipeline 100 for aircraft or automotive parts. A data supply 101 inputs data structures representative of mesh geometries of, for example aircraft fuselage components (such as stringers or ribs/frames) or airfoil components, into the pipeline 100.

The data supply 101 may comprise a data storage of a computer system. The data structures representing the mesh geometries are then resident in the data storage as logical structures connecting the data points into the mesh geometry. Examples of suitable logical structures are adjacency matrices.

Each of the mesh geometries comprises a number of data points and a local coordinate system. The data points are addressable by spatial coordinates of the associated local coordinate system or by a fixed reference coordinate system.

The associated local coordinate system defines neighborhood relations between the data points in each of the respective mesh geometries. For example, data points being one mesh width apart in terms of local coordinates are considered neighboring points. In this way, the local coordinates are suitable to express the mesh structure of the mesh.

The reference coordinate system spans a coordinate space for globally representing the mesh geometries. The mesh geometries are suitable to be rendered into graphical representations of shapes and forms of the aircraft parts to be manufactured. Reference to coordinates (x,y,z) in the following are understood to be taken with respect to the fixed reference coordinate system.

The mesh geometries may be obtained from computer simulations such as Monte-Carlo simulations or real world tests such as crash-tests. In either case, the mesh geometries are subject to statistical variations. In the case of the computer simulations, the statistical variations have been simulated by sampling from suitable probability distributions using, for example, the Monte-Carlo-Markov-Chain (MCMC) method.

The supplied mesh geometries are then fed via a suitable interface 105a into the computer-aided development or testing tool 105 according to the invention. The tool 105 may be arranged as a suitably programmed software or hardware modules, comprising, as components, a coordinate tracker module 105b, a statistics module 105c, a solver module 105d, and a mesh constructor 105e. Platforms such as Mathwork's MATLAB™ or SIMULINK™, or MICROSOFT's Visual-Studio (C++, C#, VB.NET) provide suitable environments for programming the tool 105 and the components 105b-e.

Based on the supplied mesh geometries, the tool 105 outputs a single, enveloping mesh geometry EMG. The enveloping mesh geometry EMG is a geometric representation of the mean of a probability distribution P of the sample space of all possible mesh geometries, the totality of the supplied meshes being samples drawn from that sample space. The sample space is spanned by the fixed reference coordinate system. The statistical ensemble of the sampled mesh geometries will be referred to in the following as the sample mesh geometries MG.

The probability distribution P is defined by an underlying probability density of the statistical ensemble. The enveloping mesh geometry accounts for the totality of the statistical variations across the totality of the supplied meshes by "enveloping" the region of the sample space where the "denseness" of the underlying probability density is at its highest. In other words, an arbitrary mesh geometry drawn from the statistical ensemble of all possible mesh geometries is most likely to fall into the enveloped coordinate space.

The tool 105 is arranged to receive input from a user. The user may supply alpha levels as input upon which the tool 105 outputs alpha enveloping mesh geometries EMG-α based on the enveloping mesh geometry EMG. Generalizing the mean represented by the enveloping mesh geometry, the alpha enveloping mesh geometries EMG-α geometrically represent the α-Quintiles of the probability distribution P. The alpha enveloping mesh geometries EMG-α are suitable to envelop that region of the sample space where at least α-percent of the denseness of the probability density is concentrated. In other words, any sampled mesh geometry stands a chance of at least α-% to fall into the coordinate space enveloped by the corresponding alpha enveloping mesh geometry EMG-α. The constructed alpha-enveloping mesh geometry EMG-α statistically envelops at a degree specified by the α-level the sample mesh geometries and all further sample mesh geometries drawn from the global probability distribution. In other words, having regard to the provided α-level, the constructed alpha-enveloping mesh geometry EMG-α envelops the sample mesh geometries in a statistically correct manner. In yet other words, the alpha-enveloping mesh geometry EMG-α envelops on average α-% of the sample mesh geometries and any sample of sample mesh geometries including the current sample mesh geometries. Summarizing by using the probability distribution P, the role of the alpha-enveloping mesh geometry EMG-α can be expressed as $P[\text{EMG-}\alpha \text{ envelops a sample mesh geometry}] \geq \alpha$ The enveloping mesh geometry and/or the alpha enveloping mesh geometries EMG-α are then relayed to the check point 115 to control a graphics module 115a for displaying the enveloping meshes EMG, EMG-α on a monitor 116. Along with the displayed enveloping meshes EMG, EMG-α there are displayed further meshes of already manufactured parts which are provided by a feedback supply 110 or further meshes acquired from further tests supplied by the data supply 101. Joint display of the meshes allows the user to quickly decide, upon visually examination, whether the further meshes comply with pre-determined manufacturing tolerances or parameters indicative to expectations form the test runs. Preferably, the sampled mesh geometries MG or the further mesh geometries are displayed inside the enveloping meshes EMG, EMG-α. The manufacturing tolerances or the parameters are expressible in terms of the α-level. If the user decides that the manufacturing tolerances have been met, the check point 105 issues a respective YES or NO signal with is then fed into down-stream processing stages 120 of the manufacturing pipeline 100.

Figure 2:
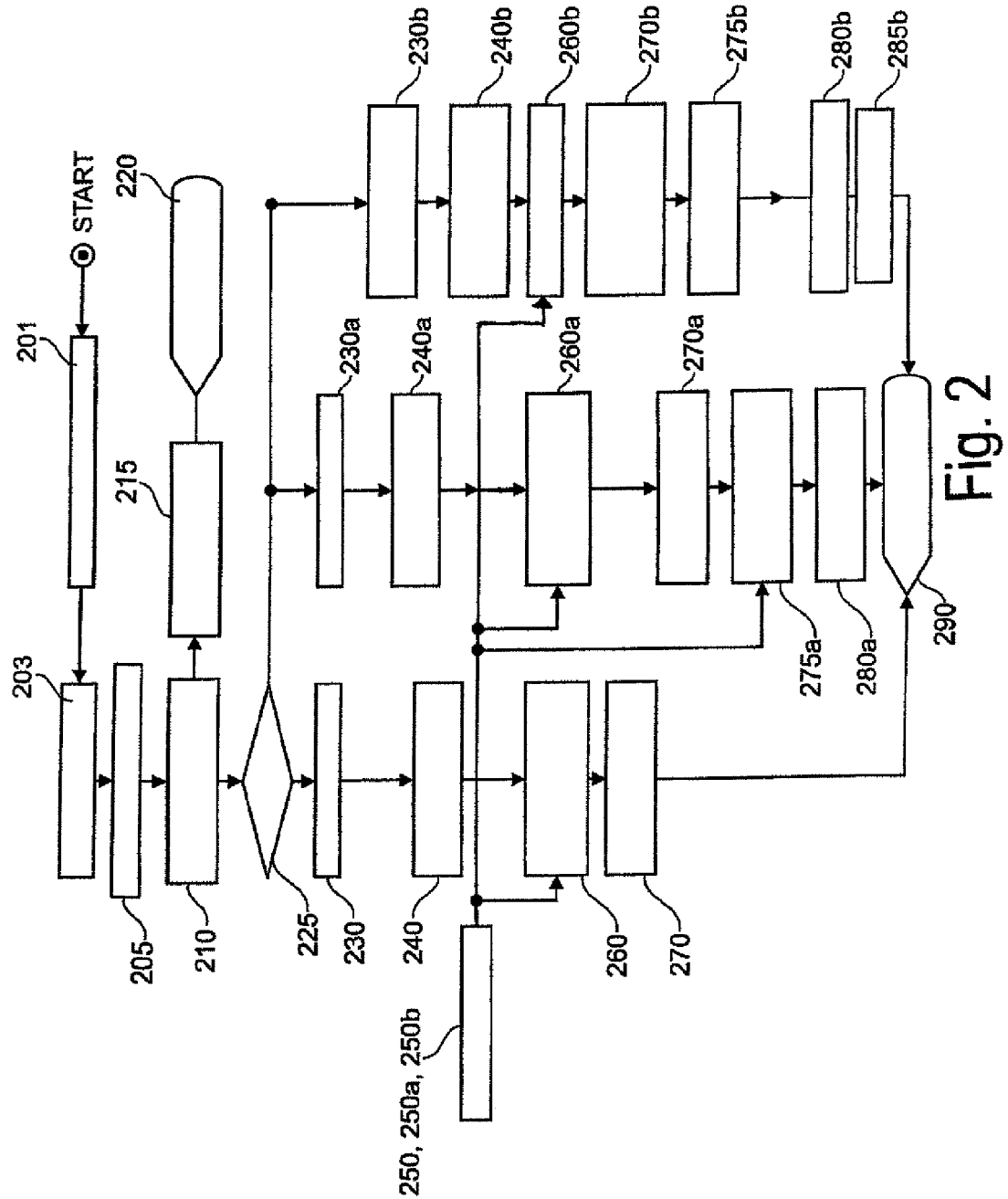
FIG. 2 is a flow chart of the method according to the invention.

The operation of the tool 105 will now be explained in more detail by reference to the flow chart in FIG. 2. Tool 105 implements the method according to the invention of constructing the enveloping mesh geometries EMG, EMG-α, each comprising mean data points and alpha-enveloping data points, respectively.

The method will first be explained in relation to the enveloping mesh geometry EMG.

The tool 105 acquires, in step 201, the sample mesh geometries MG. The number of data points in each of the sample mesh geometries is assumed equal as the mesh geometries represent the same kind of aircraft part to be tested or manufactured and the mesh geometries are assumed to be acquired at the same resolution level.

Alternatively, the sample mesh geometries MG may be acquired at sample time points in time domain as snapshots of a mesh geometry. The method is therefore not restricted to spatial domain sampling. Further, in step 201, data points in any one of the mesh geometries MG is selected to reflect the user's preference for a region of interest in the sample mesh geometries MG and/or the user's desire to speed up the construction process. According to one aspect of the invention a step-width is selectable by the user to effect selecting the data points at intervals specified by the step-width. By way of example to user may have chosen that selecting every k-th data point in one of the sample mesh geometries MG suffices for his or her purposes. In this way, selecting the data points at the intervals specified by the step-widths allows constructing the enveloping mesh geometry (EMG) at different resolution levels.

Iterating over the selected data points in any one of the mesh geometries MG, a number of m disjoint sets of corresponding data points $\{(x_i, y_i, z_i)_{i=1 \ldots n}\}_{j=1 \ldots m}$ are established in step 203. Each of the n corresponding points $(x_i, y_i, z_i)$ in each of the m sets is from a different one the n sample mesh geometries MG. This is reflected in the notation, in that the corresponding data point $(x_i, y_i, z_1)$ is a data point in the i-th mesh geometry of the mesh geometries MG. m equals the number of the selected data points in any one of the sample mesh geometries MG. In other words, $\{(x_i, y_i, z_i)_{i=1 \ldots n}\}_{j=1 \ldots m}$ defines a partition of the totality of data points in all the mesh geometries MG. In order to further save CPU time, the iteration in step 203 over the sample mesh geometries MG for establishing the corresponding data points $\{(x_i, y_i, z_i)_{i=1 \ldots n}\}_{j=1 \ldots m}$ is restrictable by the user to a subset of the sample mesh geometries MG so that m may chosen to be less than the total number of available mesh geometries.

The m stets of corresponding data points $\{(x_i, y_i, z_i)_{i=1 \ldots n}\}_{j=1 \ldots m}$ can be established, for example, by using the adjacency matrix for any one of the sample mesh geometries MG or the neighborhood relations as definable by the respective local coordinates in each of the associated local coordinate systems.

The tool 105 uses the coordinate tracker 105b to track data points in the mesh geometries MG having the same local coordinates to obtain the sets of corresponding data points $\{(x_i, y_i, z_i)_{i=1 \ldots n}\}_{j=1 \ldots m}$.

According to another aspect of the present invention the method is also applicable to sample mesh geometries having a different number of data points. This scenario may occur if mesh geometries are acquired at different resolution levels. In case of mesh geometries having different numbers of data points the user may provide a coordinate chart specifying which one of the data points are to be taken to correspond.

In step 205, for each of the m sets of corresponding data points $\{(x_i, y_i, z_i)_{i=1 \ldots n}\}_{j=1 \ldots m}$, a corresponding probability density $f_j$ is estimated, the n corresponding data points $(x_i, y_i, z_i)_{i=1 \ldots n}$ being considered as drawn sample points on which the estimation is to be based.

According to one aspect of the invention, the estimation is based on non-parametric estimation techniques. Specifically an extension of the kernel density method (see B. W. Silverman, "Density Estimation for Statistics and Data Analysis", London, Chapman & Hall, 1986) to the three spatial dimensions has been found to yield good results.

According to the 3-dimensional kernel density method each of the corresponding probability densities $f_j$ is estimated in accord with formula (A):

$$\hat{f}(x, y, z) = \frac{1}{n} \sum_{i=1}^{n} \frac{1}{h_x} K\left(\frac{x-x_i}{h_x}\right) \cdot \frac{1}{h_y} K\left(\frac{y-y_i}{h_y}\right) \cdot \frac{1}{h_z} K\left(\frac{z-z_i}{h_z}\right) \quad (A)$$

In formula (A), $h_{x,y,z}$ designate the bandwidths for each of the spatial direction and K the kernel function. Both, $h_{x,y,z}$ and K, can be readily estimated by known techniques (see Silverman, supra).

As can be seen in Formula (A), the summands are products of the summands from the 1-dimensional kernel density method (see Silverman, supra) as applied separately to each one of the three spatial dimensions.

Using the Epanechnikov kernel for K allows for efficiency in terms of both, estimation accuracy and computational performance. The Epanechnikov kernel is defined by $$K(u) = \frac{3}{4}(1 - u^2)$$

for $-1 \leq u < 1$, and $K(u)=0$ for u otherwise.

The bandwidth $h_{x,y,z}$ for the 3-dimensional kernel density estimation using the Epanechnikov kernel may be chosen for each dimension separately as:

$$h = \tilde{s}(30\sqrt{\pi})^{\frac{1}{5}} \cdot \left(\frac{4}{5n}\right)^{\frac{1}{7}}, \text{ where } \tilde{s} = \sqrt{\frac{1}{n-1}\sum_{i=1}^{n}(x_i - \bar{x})^2} \text{ and } \bar{x} = \frac{1}{n}\sum_{i=1}^{n}x_i$$

(See D. W. Scott, "Multivariate Density Estimation: Theory, Practice, and Visualization", New York, John Wiley & Sons, 1992).

In step 210 each of the estimated corresponding probability densities $\hat{f}_j$ according to formula (A) is maximized by know numerical techniques. The maximization yields the mean data points $\{(\hat{x}_i, \hat{y}_i, \hat{z}_i)_{i=1 \ldots m}\}$ as a set of m arguments at which the estimated corresponding probability densities $\hat{f}_j$ have their highest denseness. In other words, $\hat{f}_j$ assumes its respective maximum value at $(\hat{x}_i, \hat{y}_i, \hat{z}_i)$, for $1 \leq j \leq m$. This step is implemented by the statistics module 105c in combination with the solver 105d.

According to one aspect of the present invention, the probability densities are initially evaluated direct at the samples $(x_i, y_i, z_i)_{i=1 \ldots n}$. Proceeding from the sample yielding the highest denseness, the maximum value is determined iteratively. In this manner quick convergence can be achieved as the argument for the maximum value is expected to be located in a neighborhood of that sample.

The mean data points span the enveloping mesh geometry EMG, the enveloping mesh geometry EMG being the geometric representation of the mean of the probability distribution P over the sample space of all mesh geometries. The corresponding data points in the j-th set of corresponding data points are associated with exactly one of the mean data points. The associated mean data point is the maximizing argument of the estimated corresponding probability density $\hat{f}_j$ for that j-th set of corresponding data points. As the sets of corresponding data point define a partition of the totality of data points in all the mesh geometries, it follows that any data point in any sample mesh geometry MG has an associated mean data point.

In step 215, the enveloping mesh geometry EMG is constructed by shifting or replacing each of the data points in any one of the mesh geometries MG to or by the respective associated mean data point. In other words, the mesh geometries are equivalent for the purpose of constructing the enveloping mesh geometry from the mean data points $\{(\hat{x}_i, \hat{y}_i, \hat{z}_i)_{i=1 \ldots m}\}$. This step is implemented by the mesh constructor 105e.

Optionally, the enveloping mesh geometry so constructed is displayed on a graphics display with or without any one or more of the sample mesh geometries MG in step 220.

In step 225 the type of the mesh geometries MG is determined for the purposes of constructing the alpha-enveloping mesh geometries EMG-α. The mesh type is a volume mesh, a surface mesh or a path. A volume mesh comprises as elements solids such as cubes, cuboids, tetrahedra or other polyhedra. Each of the elements is joined to another at their boundary surfaces to obtain the volume mesh.

Similarly, but at a lower spatial dimension, the surface mesh comprises polygons joined at their boundary edges and the path comprises lines joined at their vertices.

The determination of the mesh type is automatic and can be based, for example, on the logical structure of the data type used to store the mesh geometry. Alternatively, the user may provide information indicative to the mesh type by way of manual input.

The method is based for each of the three mesh types on the estimated corresponding probability densities $\hat{f}_j$ and the enveloping mesh geometry EMG constructed according to the previous steps underlies the alpha-mesh geometries EMG-α. The alpha-mesh geometries EMG-α inherits the mesh structure of the enveloping mesh geometry EMG and in that sense underlies the alpha-mesh geometries EMG-α. Further, the enveloping meshes EMG, EMG-α inherit the mesh type of the sample mesh geometries MG.

The method of constructing the alpha-mesh geometries EMG-α at the given α-level depends on the mesh type. The subsequent steps of the method will be explained for each mesh type separately. In order to avoid repetitions, similar steps will be cross-referenced throughout the following three sections devoted to the three mesh types.

Volume Meshes

In case of volume meshes, the surface elements SEV spanned by a convex hull of the mean data points of the enveloping mesh geometry EMG are determined in step 230. The convex hull can be determined by means of standard geometry packages in MATLAB. Step 230 comprises determining surface normals of each of the surface elements.

Figure 3:
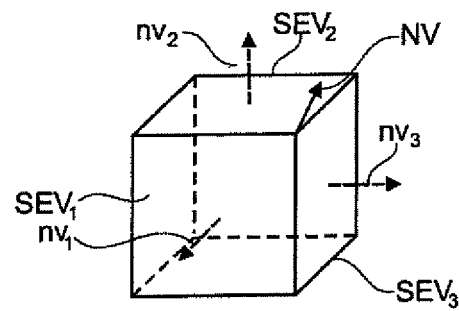
FIG. 3 shows averaging according to the invention of surface normals for volume meshes.

In step 240, the surface normals $nv_{1,2,3}$ of the surface elements $SEV_{1,2,3}$ bordering at any one of the mean data points are averaged to obtain an averaged surface normal NV (see FIG. 3). The averaged surface normal NV is associated with the mean data point at which the surface elements border. A weighting scheme for the averaging procedure is selectable and adaptable to the underlying enveloping mesh geometry. As a default, the familiar arithmetic mean may be used. Step 240 is repeated for each of the mean data points to obtain the associated averaged surface normals for each of the mean data points.

In step 250 the α-level is received. In practice the α-level is a number larger than 0 and less than 1.

In step 260 the following equation B is solved for each j in a positive direction along each one of lines determined by the associated averaged surface normals NV ($NV_{1,2,3}$ designating the spatial components of NV):

$$\alpha \cdot \hat{f}_{max} \overset{!}{=} \hat{f}(\delta, NV) \quad \text{(B)}$$
$$= \frac{1}{n}\sum_{i=1}^{n} \frac{1}{h_x} K\left(\frac{\delta \cdot NV_x - x_i}{h_x}\right) \cdot$$
$$\frac{1}{h_y} K\left(\frac{\delta \cdot NV_y - y_i}{h_y}\right) \cdot \frac{1}{h_z} K\left(\frac{\delta \cdot NV_z - z_i}{h_z}\right)$$

The direction, parameterized by δ, is positive if one proceeds in the direction of the surface normals, that is, to the outside of the enveloping mesh geometry EMG. Save for 'NV', and 'δ', the notation in formula (B) is the same as in Formula (A) above.

Solving equation B along the lines LNV allows reducing a 3-dimensional equation to a 1-dimensinonal equation and therefore saving of CPU time.

The solution of equation B at each of the corresponding data points results in the alpha-enveloping data points of the alpha-enveloping mesh geometries EMG-α.

The alpha-enveloping mesh geometries EMG-α are constructible, in step 270, by joining the alpha-enveloping data points according to the neighborhood relations expressed by local mesh coordinates of the mean data points of the underlying enveloping mesh geometry EMG. In other words, the alpha-enveloping mesh geometries EMG-α retains or inherits the mesh structure of the enveloping mesh geometry EMG.

The alpha-enveloping mesh geometries EMG-α envelop the sample mesh geometries at a degree determined by the α-level.

Optionally, the alpha-enveloping mesh geometries EMG-α can be displayed in step 290.

Surface Meshes

In case of surface meshes, the surface elements spanned by the mean data points of the enveloping mesh geometry EMG are determined in step 230*a*. In this case the enveloping mesh geometry EMG is also a surface mesh. Step 230*a* comprises determining surface normals of each of the surface elements.

Figure 4:
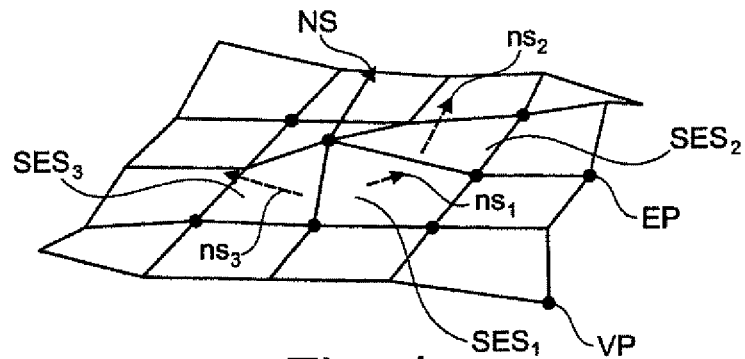
FIG. 4 shows averaging according to the invention of surface normals for surface meshes.

In step 240*a*, for each mean data point, the surface normals $ns_{1,2,3}$ of the surface elements $SES_{1,2,3}$ bordering at the mean points are averaged to obtain an averaged surface normal NS associated with the mean data point at which the surface elements $SES_{1,2,3}$ border, see FIG. 4.

In step 250*a* the α-level is received. This step is analogous to step 250 above for the case of volume meshes.

In step 260*a* equation B is solved in a positive and negative direction along each one of lines LNS determined by the associated averaged surface normals NS. Safe for solving along the negative direction rather merely along the positive direction step 260*a* is completely analogous to step 260 above in relation to volume meshes. Solving in both directions therefore yields two alpha-enveloping data points per associated mean data point.

In step 270*a* it is determined, for each mean data point, whether or not it is a singular point. Singular points are points on the boundary of the enveloping mesh geometry EMG. Therefore, with reference to FIG. 4, a singular point is either a point VP on an outer vertex of the enveloping mesh geometry EMG or a point EP on an outer edge of the enveloping mesh geometry EMG. The determination may be based, for example, on the logical structure of the data structure used to store the enveloping mesh geometry EMG.

In case a mean data point is singular, n further vectors 11, in addition to the associated surface normal, are associated with the singular mean data point MDP in step 275*a*.

Associating further vectors 11 allows compensating for the lack of information about the local geometry around the singular point, because singular points have fewer bordering surface elements than non-singular points (see FIG. 4).

This compensation will make the subsequent construction of the alpha-enveloping mesh geometry statistically more accurate. The higher accuracy is a consequence of associating n more alpha-enveloping data points with singular points, that is, one alpha-enveloping data point per each one of the n vectors.

Figure 5:
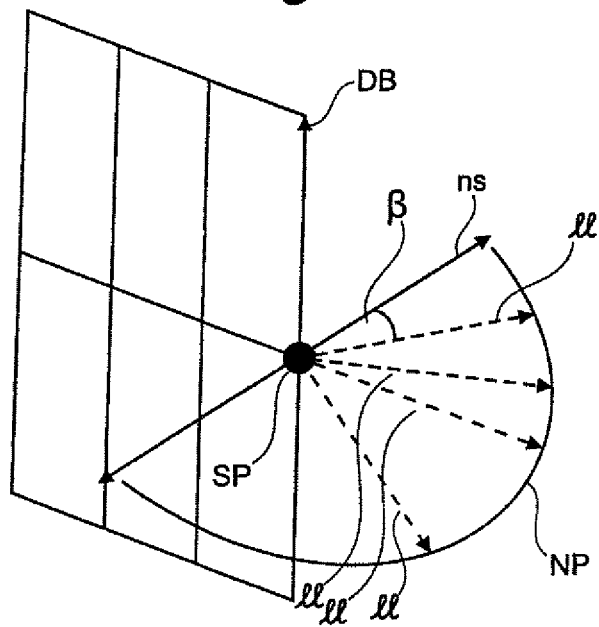
FIG. 5 shows averaging according to the invention of normals at singular points on surface meshes.

With reference to FIG. 5, the n further vectors 11 are obtained in step 275*a* as follows (see FIG. 5). A plane NP is specified passing through the singular point SP and being perpendicular to the averaged surface normal associated with that singular point SP and the direction DB of the boundary at the singular point SP. If the singular point is an outer vertex, any one of the two directions of the boundary at that point may be taken. The user provides a splitting angle β. The splitting angle β is chosen in relation to n in that β divides 180° into n. The n vectors 11 are then arranged in the plane NP to radially emanate from the singular point, any two neighboring vectors being set at the splitting angle β. The splitting angle β is measured relative to the averaged surface normal ns and the vectors are arranged at multiplies of β in a mathematically positive orientation relative to the averaged surface normal. In other words, the vectors, emanating from the singular point, define a semicircle in the specified plane. Step 275*a* is then iterated over all singular points so that a bundle of the n vectors per associated singular point SP is obtained.

In step 275*a*, similar to step 260*a*, equation B is solved in positive direction (that is, the direction specified by the vectors 11) along each of the n vectors 11 in the bundle for each of the associated singular point SP to obtain n alpha-enveloping data points per associated singular mean data point MDP. Again, step 275*a* is iterated over each singular point SP.

In step 280*a* the alpha-enveloping mesh geometry EMG-α is constructed. To this effect, in step 280*a*, the alpha-enveloping data points obtained in steps 260*a* and 275*a* are joined whilst retaining or inheriting the mesh structure of the associated enveloping points of the enveloping mesh geometry EMG. More specifically the alpha-enveloping mesh geometry EMG-α so constructed is, by construction, also a surface mesh as required for the current case of surface meshes.

Optionally, the alpha-enveloping mesh geometries EMG-α can be displayed in step 290.

Paths

Figure 6:
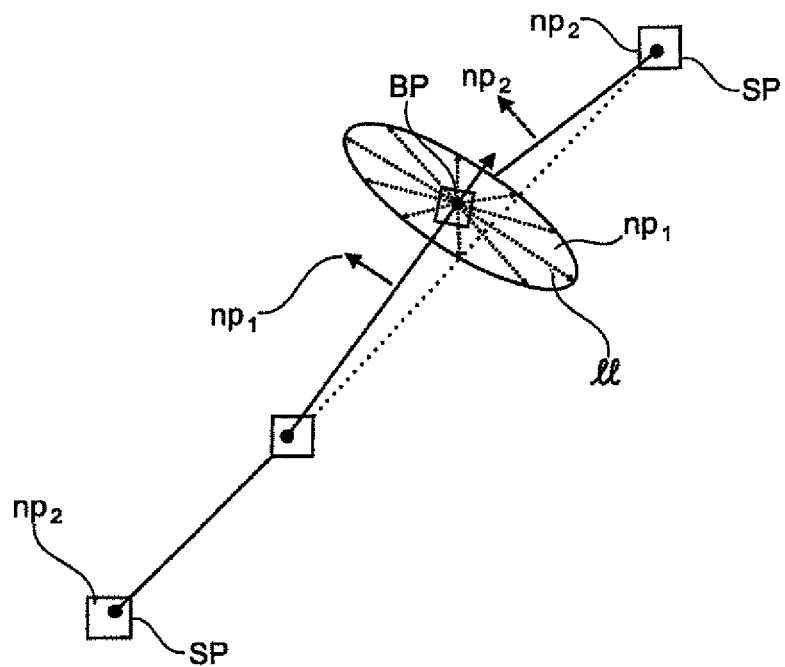
FIG. 6 shows averaging according to the invention of normals for paths.

In case the sample mesh geometries are paths, the enveloping mesh geometry EMG is also a path defined by lines elements as depicted in FIG. 6. In this case, the singular points SP are the two endpoints of the path and the other non-singular mean data points are border points of any two of the lines elements.

In step 230*b*, the singular points SP, that is, the two endpoints, are determined. Again, the determination can be based on the logical structure of the data structure used to store the path.

In step 240*b*, the directions defined by the two normals $np_{1,2}$ of the lines elements bordering at any one of the bordering points are averaged by using the two normals to specify an averaging normal plane $NP_1$ passing through the bordering points BP. By way of dependence on the border point the normal plane is associated with that border point. Step 240*b* is iterated over all non-singular mean data points. In step 240*b*, averaging normal planes for the two endpoints are also obtained by associating with each of the endpoints the plane specified by that endpoint and the direction given by the first and last line element, respectively (see FIG. 6).

As in the previous two cases, in step 25*b* the α-level is received. Analogous to the previous case on surface meshes the user further specifies a splitting angle β dividing 180° into n.

In step 260*b*, at each bordering point BP or endpoint, n vectors are arranged in the associated normal planes to radially emanate from the border point or endpoint. Thus and again as in the previous case, a respective bundle of n vectors 11 is associated by means of the associated normal planes $NP_1$, $NP_2$ with each one of the bordering points BP or endpoints SP. The bundle of vectors 11 defines a semicircle in the planes $NP_1$, $NP_2$ centered at the border point or the endpoint (see FIG. 7).

In step 270*b*, equation B is solved in positive and negative direction along each of the n vectors 11 in the bundle at each of the associated border points or the endpoints to obtain 2n alpha-enveloping data points per associated bordering points BP or end points SP. Step 270*b* is iterated over each border point or endpoint. Further in step 280*b*, for each endpoint, equation B is solved along the lines determined by the respective endpoint and the direction of the first and last line element, respectively. The solution yields a further alpha-enveloping data point for each of the endpoints SP.

Figure 7:
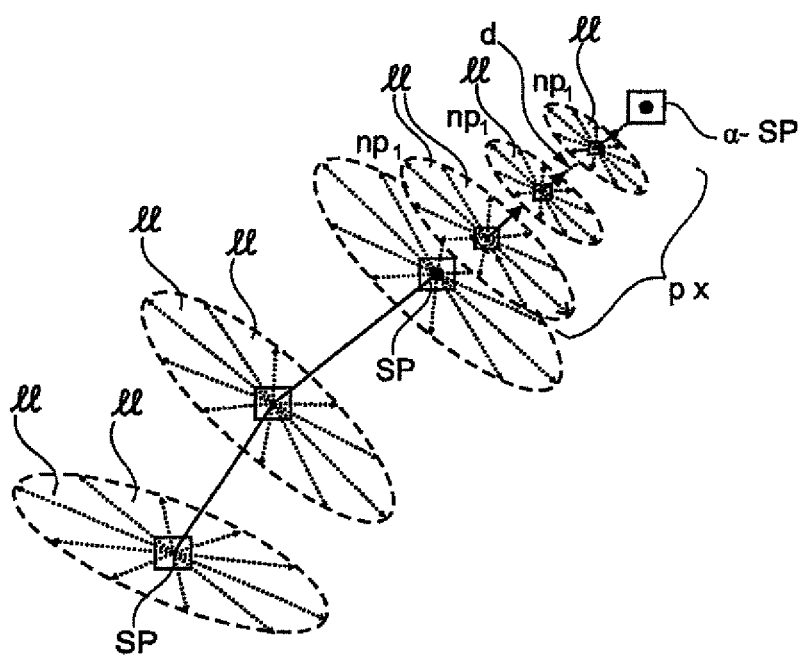
FIG. 7 shows averaging according to the invention of normals at endpoints of paths.

The user then specifies an endcap number p. With reference to FIG. 7, in step 275*b*, a number of p copies of the normal plane associated with the endpoints SP are then equidistantly positioned on the line d joining the endpoints and the alpha-enveloping data point α-SP of the endpoint SP. Similar to step 275*a* and based on n and β, a bundle of n vectors 11 are arranged in semicircles on each of the planes, the semicircles being centered on the joining line.

In step 280*b*, equation B is then solved in positive and negative direction along each of the lines specifies by the vectors of the p bundles for each one of the equidistantly positioned planes $NP_1$. In this way a total of 2n (p+1)+1 alpha-enveloping data points for each of the endpoints SP is obtained, the total including the further alpha-enveloping data point of step 280*b* and the bundle of alpha-enveloping data points of step 270*b*.

In step 285*b*, the alpha-enveloping mesh geometry EMG-α is constructed. To this effect, in step 285*b*, the alpha-enveloping data points obtained in steps 270*b* and 280*b* are joined whilst retaining or inheriting the mesh structure of the associated mean enveloping points of the enveloping mesh geometry EMG.

Each alpha-enveloping data point in each bundle of the alpha-enveloping data points is joined with the immediate neighboring alpha-enveloping data point in that bundle. In addition each of the alpha-enveloping data points so joined is further joined with corresponding alpha-enveloping data points in the bundles of alpha-enveloping data points for neighboring copies of the normal plane $NP_1$. Such a correspondence can be established by using the adjacency matrix or the local coordinates for there are an equal number of alpha-enveloping data points in each of the bundles per plane. In addition, the alpha-enveloping data points in the bundle of the outermost plane—the plane closer to the respective alpha-enveloping data point α-SP—are all further joinable with that singular alpha-enveloping data point α-SP.

Optionally, the alpha-enveloping mesh geometries EMG-α can be displayed in step 290.

The method according to the invention is also applicable to mixed type mesh geometries, comprising portions of volume meshes, surface meshes and paths. In case of mixed-type meshes, the method is applied separately to the three portions of the mixed-type mesh according to the three cases described above.

It is to be understood that the sequence of the steps outlined above is merely exemplary. The parameters α, β, n and p may be provided at other suitable instances than the one described above during the execution of the method.

Although the invention has been described relative to several specific embodiments thereof, it is not so limited and many modifications and variations thereof will be readily apparent to those skilled in the art in the light of the above teachings. Specifically it would be readily apparent to the skilled artisan that features explained in relation to one aspect or embodiment of the invention are combinable with features explained in relation to other aspects or embodiments of the invention. It is therefore understood that within the scope of the appended claims, the invention may be practiced otherwise than as specifically described.

The embodiments and aspects of the invention in which an exclusive property or privilege is claimed are defined as follows:

1. A method of constructing an enveloping mesh geometry for a plurality of sample mesh geometries, the method executable by a processor system, the method comprising the steps of:
    the processor system selecting data points in one of the plurality of sample mesh geometries;
    for each selected data point, the processor system establishing corresponding data points in one or more of the other sample mesh geometries to obtain different sets of corresponding data points;
    the processor system non-parametrically estimating a probability density $f_j$ for each one of the sets of corresponding data points;
    based on the estimated probability densities $\hat{f}_j$, the processor system obtaining mean data points; and
    the processor system constructing the enveloping mesh geometry by using the obtained mean data points,
    wherein the processor system operates to construct the enveloping mesh geometry by replacing each selected data point or each corresponding data point in any one of the sample mesh geometries with an associated one of the mean data points, the associated one of the mean data points being based on the argument of the maximum value of the respective estimated probability densities $\hat{f}_j$, and
    wherein the method further comprises:
    the processor system averaging normals of elements of the enveloping mesh geometry or normals of elements of a convex hull of the enveloping mesh geometry to obtain averaged normals associated with the mean data points; and
    the processor system solving the estimated probability densities $\hat{f}_j$ along the associated averaged normals for a predetermined value α to obtain enveloping data points of a new enveloping mesh geometry, the new enveloping mesh geometry being suitable to statistically envelop the sample mesh geometries at an enveloping degree corresponding to the predetermined value α.

2. The method according to claim 1, wherein, if a mean data point is a singular point of the enveloping mesh geometry or of the convex hull, solving the estimated probability densities $\hat{f}_j$ for the predetermined value α along a bundle of lines emanating from the singular mean data point to obtain a corresponding bundle of enveloping data points associated with the singular point.

3. The method according to claim 1, wherein the probability density $f_j$ is estimated using the kernel density estimation method.

4. The method according to claim 1, wherein the method further comprises:
    displaying the mesh geometry of an auto- or aircraft part inside the enveloping mesh geometry or the new enveloping mesh geometry to allow visually or automatically test compliance with manufacturing tolerances, the tolerances being related to the predetermined enveloping degree α or the maximum values.

5. A non-transitory computer readable medium having instructions encoded thereon for enabling a processor to construct an enveloping mesh geometry for a plurality of sample mesh geometries, the instructions comprising:
    selecting data points in one of the plurality of sample mesh geometries;

for each selected data point, establishing corresponding data points in one or more of the other sample mesh geometries to obtain different sets of corresponding data points;

non-parametrically estimating a probability density $f_j$ for each one of the sets of corresponding data points;

based on the estimated probability densities $\hat{f}_j$, obtaining mean data points; and constructing the enveloping mesh geometry by using the obtained mean data points, wherein the enveloping mesh geometry is constructed by replacing each selected data point or each corresponding data point in any one of the sample mesh geometries (MG) with an associated one of the mean data points, the associated one of the mean data points being based on the argument of the maximum value of the respective estimated probability densities $\hat{f}_j$, and wherein the instructions further comprise:

averaging normals of elements of the enveloping mesh geometry or normals of elements of a convex hull of the enveloping mesh geometry to obtain averaged normals associated with the mean data points; and solving the estimated probability densities $\hat{f}_j$ along the associated averaged normals for a predetermined value α to obtain enveloping data points of a new enveloping mesh geometry, the new enveloping mesh geometry being suitable to statistically envelop the sample mesh geometries at an enveloping degree corresponding to the predetermined value α.

6. A computer-aided development or quality control system configured to construct an enveloping mesh geometry for a plurality of sample mesh geometries, the system comprising the computer-implemented components:

an interface configured for acquisition of a plurality of sample mesh geometries into a hardware data storage and for selecting data points in one of the plurality of sample mesh geometries;

a coordinate tracker module configured to establish, for each selected data point, corresponding data points in one or more of the other sample mesh geometries to obtain different sets of corresponding data points;

a statistics module configured for non-parametrically estimating a probability density $f_j$ for each one of the sets of corresponding data points;

a solver configured to obtain, based on the estimated probability densities $\hat{f}_j$, mean data points of the enveloping mesh geometry as arguments to maximum values of the estimated probability densities $\hat{f}_j$; and a mesh constructor for constructing the enveloping mesh geometry by replacing each selected data point or each corresponding data point in any one of the sample mesh geometries with an associated one of the mean data points, the associated one of the mean data points being based on the argument of the maximum value of the respective estimated probability density $\hat{f}_j$, wherein the solver is further configured to:

average normals of elements of the enveloping mesh geometry or normals of elements of a convex hull of the enveloping mesh geometry to obtain averaged normals associated with the mean data points; and solve the estimated probability densities $\hat{f}_j$ along the associated averaged normals for a predetermined value α to obtain enveloping data points of a new enveloping mesh geometry, the new enveloping mesh geometry being suitable to statistically envelop the sample mesh geometries at an enveloping degree corresponding to the predetermined value α.

7. The system according to claim 6, wherein the system further comprises:

a computer graphics module configured to drive or control a graphics display, displaying the mesh geometry of an auto- or aircraft part inside the enveloping mesh geometry or the new enveloping mesh geometry to allow visually or automatically test compliance with manufacturing tolerances, the tolerances being related to the predetermined enveloping degree α or the maximum values.

8. The system of claim 6, further comprising a computer readable medium storing thereon the mean data points of the enveloping mesh geometry and/or a data structure representative of the enveloping mesh geometry.

* * * * *